United States Patent [19]

Takagi

[11] Patent Number: 4,556,185
[45] Date of Patent: Dec. 3, 1985

[54] SEAT FRAME FOR A VEHICLE SEAT
[75] Inventor: Genziro Takagi, Akishima, Japan
[73] Assignee: Tachikawa Spring Co. Ltd., Japan
[21] Appl. No.: 558,531
[22] Filed: Dec. 6, 1983
[51] Int. Cl.$^4$ ........................................... F16M 13/00
[52] U.S. Cl. ..................................... 248/421; 248/422; 297/348
[58] Field of Search ............... 248/419, 421, 422, 396; 297/347, 348

[56] References Cited

U.S. PATENT DOCUMENTS

| | | | |
|---|---|---|---|
| 2,132,009 | 10/1938 | Ball | 248/422 |
| 2,219,456 | 10/1940 | Saunders | 248/419 |
| 2,241,559 | 5/1941 | Schulz | 248/419 |
| 2,942,647 | 6/1960 | Pickles | 248/421 |
| 3,049,330 | 8/1962 | Coons | 248/419 |
| 3,335,995 | 8/1967 | Pickles | 248/419 |
| 4,128,225 | 12/1978 | Kluting | 248/421 |
| 4,422,611 | 12/1983 | Kitsuda | 248/421 |

FOREIGN PATENT DOCUMENTS 2041738  9/1980  United Kingdom ............... 248/422

Primary Examiner—J. Franklin Foss
Assistant Examiner—Robert A. Olson
Attorney, Agent, or Firm—Cushman, Darby & Cushman

[57] ABSTRACT

A seat frame for use in a vehicle seat which is formed by connecting two side frames to front and rear frames and is provided with two link mechanisms rotatably mounted between the respective inside surfaces of said two side frames and slide rails or a vehicle floor.

5 Claims, 3 Drawing Figures

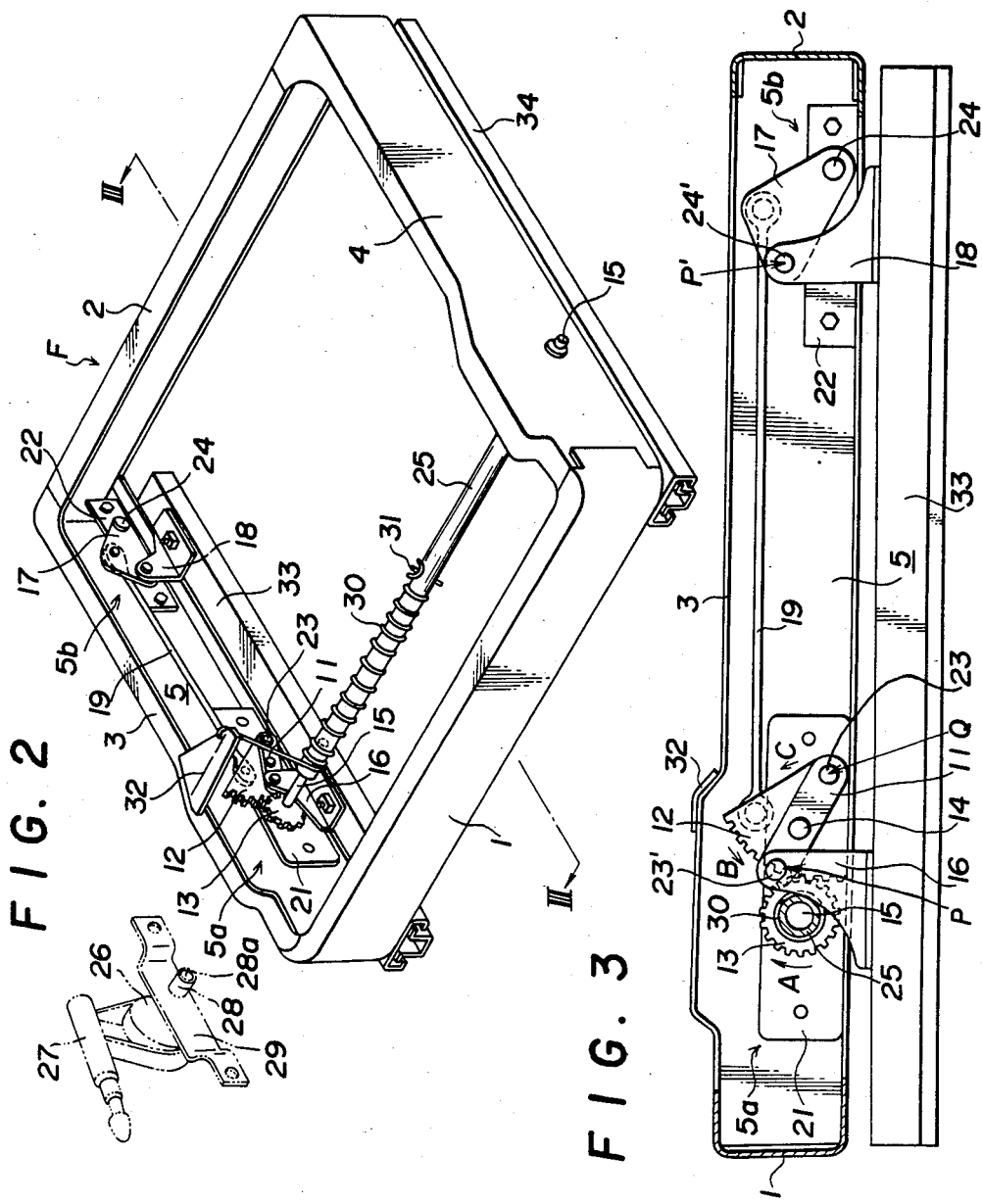

SEAT FRAME FOR A VEHICLE SEAT

BACKGROUND OF THE INVENTION

1. Field of the Invention

The present invention relates to a seat frame for a vehicle seat, and more particularly, to an improved seat frame including a lifter which is capable of vertically adjusting of the seat.

2. Description of the Prior Art

Conventionally, it has been a problem that the position of a driving wheel may be too high or too low for a driver according to his or her physique. In order to solve this problem, there has been proposed a seat of the type having a lifter which can adjust the height of the seat so as to suit the physique or preference of the driver.

In the above conventional seat of the type having the lifter, which is constructed by assembling the lifter between a seat frame and a seat slider on the side of a vehicle body, the lifter is provided with two symmetrical right and left link mechanisms, which are connected with each other by means of a connecting member for cooperative operation and also which are provided with a stopping operation mechanism at one side portion thereof. Therefore, the lifter cannot be installed inside the seat frame, but rather must inevitably be interposed between the lower surface side of the seat frame and the upper surface side of the seat slider.

However, since the interposition of the lifter between the seat frame and the seat slider increases the seat in thickness and thus raises the sitting position, there must be formed in the lower portion of the seat frame a recessed portion for relief of a cooperatively rotating member of the lifter link mechanism so that the seat frame can be adjacent to the seat slider. As the formation of this recess in the seat frame reduces the vertical width of the seat frame to the extent corresponding to such recessed portion and thus the strength of the seat frame is lowered accordingly, it is necessary to mount a reinforcement plate onto this recessed portion so as to compensate for the decreased strength of the seat frame. For this reason, it is difficult to reduce the thickness and weight of the seat frame.

Also, since the lifter must be assembled to the seat frame after the latter is installed, manual operations such as tightening of bolts are required, which deteriorates the efficiency of the seat assembly.

SUMMARY OF THE INVENTION

A seat frame constructed in accordance with the present invention is able to overcome the above mentioned drawbacks in the conventional seat frame with a lifter.

Accordingly, it is a principal object of the present invention to provide a seat with a lifter for use in an automobile, characterized in that the seat is reduced in both thickness and weight and also in that said lifter is improved in adjustment capability.

In order to achieve the above-mentioned object, the present invention provides a new seat frame, which comprises both side frames, a front frame and a rear frame and which is also provided with two link mechanisms arranged respectively between both surfaces of the side frames and a vehicle floor or a slide rail. According to this improved structure, the link mechanisms can be stored within the vertical thickness of the seat frame and thus the entire seat can be reduced in thickness.

It is another object of the invention to provide a simpler and lighter seat frame. According to the illustrated embodiment of the invention, it is not necessary to form such a recess in the seat frame as in the prior art for the link mechanisms. With this embodiment, since there is no need for mounting any reinforcement members to the seat frame, the seat frame can be decreased in weight and also be formed in a simple manner similar to a seat frame with no lifter.

According to another aspect of the present invention, first both link mechanisms of the lifter are respectively assembled to the inside surfaces of both side frames, then both link mechanisms are connected with each other by a connecting tube, and finally the side frames are connected to the front and rear frames to form the seat frame. In this method, the lifter can be assembled simultaneously when the seat frame is assembled. Therefore, according to the invention, the assembling operations of the lifter and seat frame can be greatly simplified as compared with the prior art method in which the lifter is assembled after the seat frame is formed.

Each of the link mechanisms comprises a plurality of links provided on the respective inside surfaces of both side frames, a sector gear non-rotatable with respect to at least one of the links and a center gear to be engaged with said sector gear. Said center gear is provided with a support shaft which projects inwardly and outwardly of said side frames. Both side frames are, in turn, connected to the front and rear frames in a manner that the support shafts of both center gears are connected with each other by means of a connecting tube. A stopping or securing operation member is engaged with the end of the center gear support shaft projecting out of the external side surface of one of said side frames. Accordingly, the securing operation member is moved with the vertical movement of the seat frame, and thus the operation member is always located within easy reach of the seat occupant, which provides easy operation.

The foregoing objects as well as other objects, features and advantages of the present invention will be more apparent to those who are skilled in the art by reading the following detailed description with reference to the appended drawings. In the drawings, which illustrate a typical embodiment of this invention, the same reference numerals represent the same or corresponding portions throughout the drawings.

BRIEF DESCRIPTION OF THE DRAWINGS

FIG. 2 is a perspective view of a seat frame assembled in accordance with the method of the present invention; and FIG. 3 is an enlarged, sectional view taken along a line III—III shown in FIG. 2.

DETAILED DESCRIPTION OF THE PREFERRED EMBODIMENT OF THE INVENTION

Figure 1:
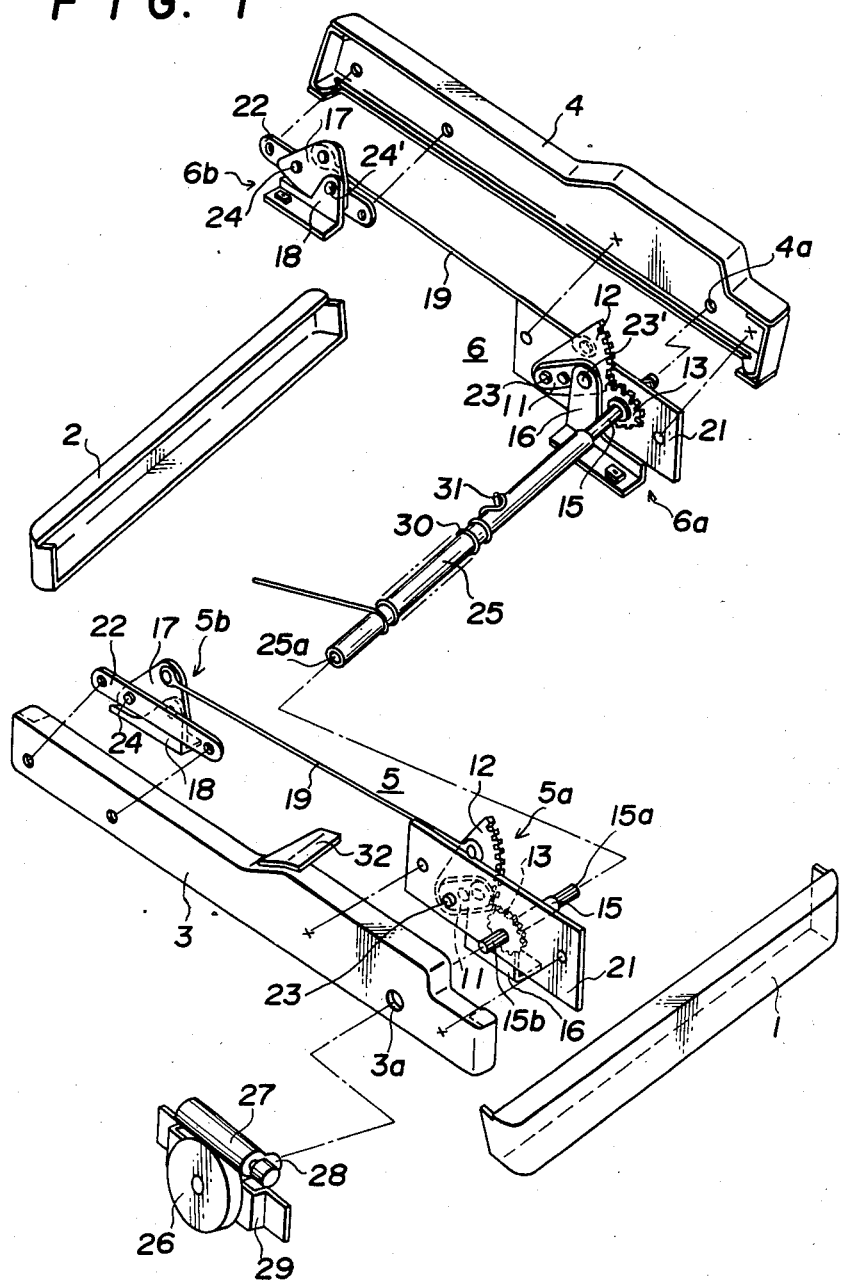
FIG. 1 is an explanatory view of a method of assembling a seat frame with a lifter according to the present invention.

FIG. 1 illustrates a state of a seat frame (F) before it is assembled. In the drawings, (1) designates a front frame, (2) represents a rear frame, and (3),(4) denote side frames respectively, all of which cooperate to form the seat frame (F).

To the front and rear portions on the respective inside surface sides of said both side frames (3) and (4) are assembled link mechanisms (5),(6) which are symmetrically constructed. Both link mechanisms (5),(6) include front link portions (5a),(6a) respectively, each of which comprises a front link (11), a sector gear (12) and a center gear (13) to be meshed with said sector gear (12). One end of the front link (11) and the bottom end of the sector gear (12) are coaxially and pivotally mounted onto the side frames (3) and (4), the intermediate portions of the front link (11) and sector gear (12) are pivotally supported by a securing pin (14), and a support shaft (15) is extended through and fixed to the axial center portion of the center gear (13), with the outer ends of the support shaft (15) being projected outwardly from shaft bores (3a), (4a) formed in the side frames (3),(4), respectively. To the other end of the front link (11) is mounted a front lower bracket (16) by means of a shaft pin (23').

The link mechanisms (5),(6) also include rear link portions (5b),(6b), respectively. Each of the rear link portions comprises a rear link (17), with one end thereof being mounted to the side frame (3) or (4) by means of a shaft (24) and the other end thereof mounted to a rear lower bracket (18) by means of a shaft pin (24'). Rear link (17) is connected with the sector gear (12) of the front link portions (5a),(6a) by means of a connecting link (19).

The front link portions (5a),(6a) and rear link portions (5b),(6b) of both link mechanisms (5),(6) thus constructed, in this embodiment, are first assembled to base plates (21),(22), respectively, and then assembled to the side frames (3),(4) by means of these base plates (21),(22) respectively. Specifically, the front link (11) and sector gear (12) of the front link portion (5a) or (6a) are rotatably mounted to the base plate (21) by means of the shaft pin (23), the support shaft (15) of the center gear (13) is extended through and journalled by the base plate (21), and each of the rear links (17) of the rear link portions (5b),(6b) are mounted to the rear base plate (22) by means of the shaft pin (24). Further, by fixing both base plates (21) and (22) to the inside surfaces of the side frames (3),(4) by means of welding, screwing or the like, the link mechanisms (5),(6) can be assembled to the side frames (3),(4).

When both side frames (3),(4) having both link mechanisms (5),(6) thus assembled thereto are connected to the front frame (1) and rear frame (2), both inner ends of the support shafts (15) of the center gears (13) in both link mechanisms (5),(6) are interconnected by means of a connecting tube (25) so that the two link mechanisms (5) and (6) can cooperate with each other. Such interconnection may be achieved in the form of a spline connection by forming the internal end of the support shaft (15) of the center gear (13) as a splined shaft (15a) as well as by providing an internal spline (25a) in both ends of the connecting tube (25).

After the seat frame (F) has been assembled in this manner, an operation lever (27) is mounted to the outer end of the support shaft (15) of the center gear (13) projected out from the outside surface of the one side frame (3) by means of an operation device to adjust the rotational position of the center gear (13) such as a braking device (26).

This braking device (26) is brought into splined connection with the support shaft (15) of the center gear (13). Specifically, splined connection is obtained by forming the outer end of the support shaft (15) of the center gear (13) as a spline shaft (15b) as well as by forming an internal spline (28a) in the shaft portion (28) of the braking device (26). Also, the braking device (26) is fixed to the side frame (3) by means of a support plate (31).

When the support shafts (15) of both center gears (13) are interconnected by means of the connecting tube (25), a balance spring (30) is wound around the connecting tube (25), then one end of the balance spring (30) is secured to a lock pin (31) projectingly provided in the connecting tube (25) and the other end thereof is secured to a retainer (32) fixed to the upper edge portion of the one side frame (3) after assembly of the seat frame (F).

Although in the illustrated embodiment the splined connection is employed to connect the support shaft (15) of the center gear (13) with the connecting tube (25) as well as the braking device (25), they may be connected with each other by other connecting methods which can provide an engagement between them in a direction of rotation; for example, they may be connected by means of a knock pin or a key.

After the seat frame having the link mechanisms (5), (6) thus assembled thereto is assembled, the front and rear brackets (16) and (18) are fixed to slide rails (33), (34), respectively, to form the seat frame with a lifter (F).

Although not shown in the drawings, a cushion is installed on the seat frame to form a seat.

In the above-mentioned assembling operations, after the front and rear link portions (5a),(6a) and (5b),(6b) of the link mechanisms (5),(6) are assembled to the base plates (21) and (22), respectively, the link mechanisms may be assembled to the respective side frames (3),(4) by means of the base plates (21) and (22), that is, they may be assembled to the side frames in their semi-unit forms for easy assembly to the side frames. Also, the base plates (21) and (22) serve to reinforce the assembling portions of the link mechanisms and, therefore, even if the side frames are generally reduced in strength to a slight degree, the link mechanisms can be assembled positively.

The operation of the seat frame with lifter F constructed as above will now be described.

First, the operation lever (27) is used to release the brake device (26) from its operative, or, braking position. Next, if the operation lever (27) is pulled up, then the center gear (13) of one link mechanism (5) is rotated and at the same time the center gear (13) of the other link mechanism (6) is rotated via the connecting tube (25) and support shaft (15). In this operation, the balance spring (30) wound round the connecting tube (25) expands between the knock pin (31) and one side frame (3) to bias both of the support shafts (15) in a direction of rotation of both center gears (13),(13), so that the operation lever (27) can be operated with a light force.

Clockwise rotation of the center gear (13) (as shown by arrow A in FIG. 3) causes the sector gear (12) to turn counterclockwise as shown by arrow B in FIG. 3. The sector gear (12) is, in fact, rotated about the securing pin (14) because the sector gear (12) is secured to the front link (11) by means of the securing pin (14), and thus there is produced an upward moment of rotation at a point Q where the front link (11) is mounted to the side frames (3),(4) by means of the shaft pin (23). In other words, since the upward moment of rotation at the mounting point Q is generated against loads applied from the seat frame side and acting downwardly on point Q, the front link (11) is rotated counterclockwise (in a direction of an arrow C) about its shaftingly mounted point P on the vehicle body side, that is, a point P where the front link (11) is mounted to the bracket (16) by means of the shaft pin (23'). This rotational movement of the front link (11) causes the rear link (17), by means of the sector gear (12) and connecting link (19), to produce the same rotating motion as that of the front link (11) about its mounting point P' on the vehicle body side, that is, a point P' where the rear link (17) is mounted to the bracket (18) by means of a shaft pin (24').

Through the rotational movements of both of the front and rear links (11) and (17) of the two link mechanisms (5),(6), the seat frame F is lifted up on the vehicle side, that is, relative to slide rails (33),(34), so that the seat is moved to a higher position. Then, if the release of the brake device (26) is stopped, then the center gear (13) is locked through the support shaft (15) and the seat is thus retained in this higher position by means of the sector gear (12), shaft pin (23) and side frames (3),(4).

Also, it should be understood that the movement of the seat to a lower position can be achieved by reversing the above-mentioned operation.

It should be understood that the present invention is not limited to the above-mentioned embodiment, but that it can be applied as a seat frame to other types of seat frames such as a seat frame of a pan-type structure. In other words, the present invention can also be applied similarly to a pan-type frame which is constructed by connecting a front frame (1) and a rear frame (2) with each other on the bottom surface side thereof and also connecting side frames (3),(4) with both side edge portions thereof. Also, the shapes of components of the present invention, that is, the front and rear links forming the link mechanisms can be changed in design at your option according to their desired operations.

As described above, according to the invention, as first both link mechanisms of the lifter are respectively assembled to the inner side walls of both side frames, then both link mechanisms are connected with each other by means of a connecting tube, and finally both side frames are connected to the front and rear frames to form the seat frame, the assembly of the lifter and the construction of the seat frame can be performed simultaneously, that is, such assembly and construction can be greatly simplified. Also, since the link mechanisms of the invention are disposed inside the seat frame and can be stored within the thickness of the seat frame, the entire thickness of the seat can be reduced. In addition, as there is no need to form any recessed portion or the like in the seat frame for installation of the link mechanisms and thus there is no need for mounting any reinforcement members in the seat frame, the seat frame can be constructed in a simple form similar to that of a seat frame with no lifter and thus the weight of the seat frame can also be reduced.

What is claimed is:

1. In a vehicle seat of the type including a seat frame, a pair of spaced slider rails to permit the vehicle seat to be reciprocally movable between forward and rearward positions and vertical adjustment means connecting said seat frame to said pair of slider rails for permitting said seat frame to be vertically adjustable relative to said slider rails, the improvement wherein said vertical adjustment means comprises:

right and left link mechanisms associated with a respective one of said pair of slide rails, each said right and left link mechanisms including, (a) front and rear brackets vertically extending above and rigidly fixed to said respective one of said pair of slide rails, (b) a front link member pivotally connected at one end thereof to said front bracket by means of a first pivot shaft, and being pivotally connected at the other end thereof to an adjacent side portion of said seat frame by means of a second pivot shaft, (c) a segment gear connected to said front link member by means of said second pivot shaft and also connected to said front link member by means of an intermediate pivot shaft such that said segment gear is coupled to said front link member so as to be immovable relative thereto, said first, intermediate and second pivot shafts being colinearly positioned along said front link member, (d) a rear link member pivotally connected at one end thereof to said rear bracket by means of a third pivot shaft and pivotally connected at the other end thereof to said adjacent side portion of said seat frame by means of a fourth pivot shaft;

(e) link rod means pivotally connected to said segment gear and to said rear link member for responsively transferring pivotal movement of said segment member to said rear link member; and (f) a center gear in meshed relationship with said segment gear, wherein said vertical adjustment means further comprises support shaft means for interconnecting said center gears of said right and left link mechanisms; and wherein said vertical adjustment means further comprises support operation means connected to shaft means for selectively rotating said shaft means, and thus said center gears, in a first rotational direction, said center gears, in turn, responsively causing said segment gears to move and rotate the front link members in a second direction, opposite to said first direction, wherein movement of said segment gears responsively causes a force to be exerted at said second pivot shaft to cause said front link member to rotate in said second direction about said first pivot shaft by virtue of said immovable coupling between said front link member and said segment gear to responsively vertically displace said second pivot shaft, and thus said seat frame, relative to said first pivot shaft whereby said seat frame is vertically adjusted relative to said slide rails.

2. In a vehicle seat of claim 1, the improvement further comprising biasing means operatively connected to said support shaft for providing a bias force to said support shaft in said first rotational direction to assist in the vertical adjustment of said seat frame.

3. In a vehicle seat of claim 2, the improvement wherein said biasing means is a balance spring wound around a predetermined portion of said support shaft and having one end fixed to said support shaft and an opposite end fixed to said seat frame so that rotation of said support shaft in said first rotational direction responsively causes said balance spring to expand to thus provide said bias force.

4. In a vehicle seat of claim 1, the improvement wherein each said right and left link mechanisms further include front and rear support plates, said center gear and said second pivot shaft being pivotally mounted to said front support plate, and said fourth pivot shaft being pivotally connected to said rear support plate, said front and rear support plates include means to rigidly attach said front and rear support plates to said adjacent side portion of said seat frame.

5. In a vehicle seat of claim 1, the improvement wherein said support shaft means includes coaxially opposing spline shafts connected to a respective said center gear and a connecting tube having ends in splined connection with respective said spline shafts.

* * * * *